(12) United States Patent
Osada et al.

(10) Patent No.: US 10,023,134 B2
(45) Date of Patent: Jul. 17, 2018

(54) WIRING HARNESS ATTACHING STRUCTURE

(71) Applicant: Yazaki Corporation, Tokyo (JP)

(72) Inventors: Yasumasa Osada, Susono (JP); Gaku Ito, Susono (JP)

(73) Assignee: Yazaki Corporation, Tokyo (JP)

( * ) Notice: Subject to any disclaimer, the term of this patent is extended or adjusted under 35 U.S.C. 154(b) by 314 days.

(21) Appl. No.: 14/672,496

(22) Filed: Mar. 30, 2015

(65) Prior Publication Data
US 2015/0203058 A1 Jul. 23, 2015

Related U.S. Application Data

(63) Continuation of application No. PCT/JP2013/076668, filed on Oct. 1, 2013.

(30) Foreign Application Priority Data

Oct. 3, 2012 (JP) .................................. 2012-221130
Sep. 27, 2013 (JP) .................................. 2013-202171

(51) Int. Cl.
*B60L 1/00* (2006.01)
*B60L 3/00* (2006.01)
(Continued)

(52) U.S. Cl.
CPC ...... *B60R 16/0215* (2013.01); *B60R 13/0243* (2013.01); *B60R 16/0207* (2013.01); *H02G 3/0462* (2013.01); *H02G 3/386* (2013.01)

(58) Field of Classification Search
CPC ............ B60R 16/0215; B60R 13/0243; B60R 16/0207
(Continued)

(56) References Cited

U.S. PATENT DOCUMENTS 5,932,846 A    8/1999   Zaguskin et al.
6,142,556 A *  11/2000  Tanaka ................ B60R 16/0222
                                                      174/72 A
(Continued)

FOREIGN PATENT DOCUMENTS

DE    19620148 A    11/1997
EP    0683072 A1    11/1995
(Continued)

OTHER PUBLICATIONS

European Search Report dated Dec. 18, 2015, issued for the European patent application No. 15173697.2.
(Continued)

*Primary Examiner* — Lincoln Donovan
*Assistant Examiner* — Metasebia Retebo
(74) *Attorney, Agent, or Firm* — Locke Lord LLP; James E. Armstrong, IV; Nicholas J. DiCeglie, Jr.

(57) ABSTRACT

An object of the present invention is to provide a wiring harness attaching structure aiming at improvement in attaching workability and aiming at thinning of a vehicle door. Provided is a wiring harness attaching structure for attaching a wiring harness to a vehicle interior outer surface of a door trim constituting a vehicle door. The wiring harness is a flat cable whose width dimension is longer than a thickness dimension, is located inside a structure body containing gas phase, and is provided integrally with the structure body containing gas phase. The structure body containing gas phase is attached along the vehicle interior outer surface of the door trim. The wiring harness is attached to the door trim together with the structure body containing gas phase.

3 Claims, 8 Drawing Sheets

(51) Int. Cl.
*H02G 3/00* (2006.01)
*B60R 16/02* (2006.01)
*B60R 13/02* (2006.01)
H02G 3/04 (2006.01)
H02G 3/38 (2006.01)

(58) Field of Classification Search
USPC .......................................................... 307/9.1
See application file for complete search history.

(56) References Cited

U.S. PATENT DOCUMENTS

| | | |
|---|---|---|
| 6,428,081 B1 | 8/2002 | Williams, Jr. et al. |
| 7,763,347 B2 * | 7/2010 | Fujimoto ............ B29C 44/0415 428/310.5 |
| 2013/0292159 A1 * | 11/2013 | Gotou .................. H01B 7/0045 174/250 |

FOREIGN PATENT DOCUMENTS

| | | |
|---|---|---|
| EP | 0826558 A1 | 3/1998 |
| JP | 52-130812 | 4/1976 |
| JP | H05-114310 A | 5/1993 |
| JP | 05-046608 U | 6/1993 |
| JP | 05-046608 U | 6/1993 |
| JP | H10-71901 A | 3/1998 |
| JP | 2000-052891 A | 2/2000 |
| JP | 2000-052891 A | 2/2000 |
| JP | 2001-506480 A | 5/2001 |
| JP | 2003-197038 A | 7/2003 |
| JP | 2003-197038 A | 7/2003 |
| JP | 2003-337588 A | 11/2003 |
| JP | 2005-329838 A | 12/2005 |
| JP | 2006-256566 A | 9/2006 |
| JP | 2012-161234 A | 8/2012 |
| JP | 2012161234 A * | 8/2012 .......... H02G 3/0487 |
| WO | 00/20256 A1 | 4/2000 |

OTHER PUBLICATIONS

Kerkhoff M et al., "Kraftfahrzeuginnenraum-Verkleidungsteil", Research Disclosure, Mason Publications, Hampshire, GB, No. 438, Oct. 31, 2000, XP000994219, 2 sheets including p. 1831.
Supplementary European Search Report dated Jun. 23, 2016, issued for the European patent application No. 13843277.8.
Kerkhoff M et al., "Kraftfahrzeuginnenraum-Verkleidungsteil" Research Disclosure, Mason Publications, Hampshire, No. 438123, Oct. 31, 2000, p. 1831 and English translation thereof.
International Search Report dated Nov. 26, 2013, issued for PCT/JP2013/076668.
Notification of the Second Office Action dated Oct. 10, 2016, issued for the Chinese patent application No. 201380052232.5 and English translation thereof.
Notification of Reasons for Refusal issued in corresponding Japanese Patent Application No. JP 2013-202171, dated Feb. 23, 2018.

* cited by examiner

WIRING HARNESS ATTACHING STRUCTURE

TECHNICAL FIELD

The present invention relates to a wiring harness attaching structure for attaching a wiring harness to a vehicle interior outer surface of a door trim constituting a vehicle door.

BACKGROUND ART

Various electronic devices are mounted in an automobile as a moving vehicle. A wiring harness is used to transmit electric power, control signals, and the like to these electronic devices. As a structure for attaching this wiring harness to a door trim constituting a vehicle door, there is proposed a structure 101 for attaching a wiring harness 103 to a door trim 102B by attaching the wiring harness 103 to a sound-proof sheet 104 held between a door panel (not illustrated) and the door trim 102B constituting a vehicle door 102 and attaching this sound-proof sheet 104 to the door panel with use of attaching members 150 (illustrated in FIG. 9) as illustrated in FIGS. 8 and 9 (e.g., refer to Patent Literature 1 and Patent Literature 2).

The wiring harness 103 includes an assembled wire 131 constituted by bundling a plurality of covered wires, exterior members 132 located at middle parts of the assembled wire 131 and letting the assembled wire 131 inserted therein to protect the assembled wire 131, and connectors 133 attached to terminals of the assembled wire 131 as illustrated in FIG. 9. The exterior members 132 are provided with a plurality of locking portions 151 for attaching the assembled wire 131 to the sound-proof sheet 104. The sound-proof sheet 104 is made of a non-woven cloth such as a felt material and is formed in a flat plate shape. The sound-proof sheet 104 is provided at a plurality of locations thereof with lock receiving portions 152 receiving the locking portions 151 along a routing path of the wiring harness 103 (assembled wire 131) designed in advance. The locking portion 151 and the lock receiving portion 152 constitute the attaching member 150.

The aforementioned conventional wiring harness 103 is attached to the door trim 102B by inserting the exterior member 132 into the assembled wire 131 and attaching the connectors 133 to the terminals of the assembled wire 131 to assemble the wiring harness 103, letting the locking portions 151 of the wiring harness 103 locked by the lock receiving portions 152 of the sound-proof sheet 104 to attach the wiring harness 103 to the sound-proof sheet 104, and attaching the sound-proof sheet 104 in this state to the door trim 102B as illustrated in FIG. 10.

CITATION LIST

Patent Literature

Patent Literature 1: JP 2005-329838 A
Patent Literature 2: JP 2006-256566 A

SUMMARY OF INVENTION

Technical Problem

In recent years, along with an increase in the number of electric components to be mounted in the vehicle door 102, the routing path of the wiring harness 103 tends to be complicated. This causes a problem in which the number of the attaching members 150 for attaching the wiring harness 103 to the sound-proof sheet 104 increases, and in which work of causing the locking portions 151 locked by the lock receiving portions 152 takes long time. Also, since the electric power amount required increases, a diameter of the assembled wire 131 of the wiring harness 103 increases, which causes a problem of a size increase of the vehicle door 102. On the other hand, there is a demand for thinning of the vehicle door 102 due to enlargement of an occupant space in the vehicle interior.

An object of the present invention is to provide a wiring harness attaching structure aiming at shortening of time for attaching work and aiming at thinning of a vehicle door.

Solution to Problem

An aspect in accordance with the present invention described herein is a wiring harness attaching structure for attaching a wiring harness to a vehicle interior outer surface of a door trim constituting a vehicle door, wherein the wiring harness is a flat cable whose width dimension is longer than a thickness dimension or an electric wire formed in a flat shape, is located inside a structure body containing gas phase, and is provided integrally with the structure body containing gas phase, wherein the structure body containing gas phase is attached along the vehicle interior outer surface of the door trim, and wherein the wiring harness is attached to the door trim together with the structure body containing gas phase.

Preferably, an aspect of the present invention described herein is the wiring harness attaching structure, wherein the structure body containing gas phase includes an expanded sheet configured to include an expanded body.

Preferably, an aspect of the present invention described herein is the wiring harness attaching structure, wherein the structure body containing gas phase includes an expanded sheet configured to include an expanded body and a non-woven cloth.

Preferably, an aspect of the present invention described herein is the wiring harness attaching structure, wherein the structure body containing gas phase includes a non-woven cloth.

Preferably, an aspect of the present invention described herein is the wiring harness attaching structure, wherein the structure body containing gas phase includes an expanded sheet configured to include an expanded body and a solid sheet material.

Preferably, an aspect of the present invention described herein is the wiring harness attaching structure, wherein the structure body containing gas phase includes a non-woven cloth and a solid sheet material.

Preferably, an aspect of the present invention described herein is the wiring harness attaching structure, wherein the expanded sheet is fixed to the door trim by causing a fixing portion formed on the vehicle interior outer surface of the door trim and a fixed portion formed in the expanded sheet to engage with each other, and the expanded sheet comes in close contact with the vehicle interior outer surface of the door trim at least around the fixing portion and the fixed portion.

Preferably, an aspect of the present invention described herein is the wiring harness attaching structure, wherein the expanded sheet is configured to include at least two layers of a low expansion layer made of a low expansion expanded material having a relatively low expansion ratio, or a solid sheet material, and a high expansion layer made of a high expansion expanded material having a higher expansion ratio than that of the low expansion layer.

Preferably, an aspect of the present invention described herein is the wiring harness attaching structure, wherein the high expansion layer is provided along the vehicle interior outer surface of the door trim, and the low expansion layer or the sheet material is provided on an opposite side of the vehicle interior outer surface of the door trim with the high expansion layer interposed therebetween.

Preferably, an aspect of the present invention described herein is the wiring harness attaching structure, wherein the expanded sheet in a state in which the wiring harness is located therein is molded by bonding two sheet-like expanded materials interposing the wiring harness therebetween or is molded by filling and then curing an uncured expanded material into a mold housing the wiring harness.

Advantageous Effects of Invention

According to the aspect of the invention described herein, since the wiring harness is located inside the structure body containing gas phase and is provided integrally with the structure body containing gas phase, conventional work of attaching the wiring harness to the sheet can be dispensed with, which enables time for attaching work to be shortened. Also, since the structure body containing gas phase protects the wiring harness, the exterior members can be omitted, which enables the vehicle door to be thinned. Further, since the wiring harness is the flat cable or the electric wire formed in a flat shape, further thinning can be achieved.

According to the aspect of the invention described herein, since the wiring harness is located inside the elastic expanded sheet and is provided integrally with the expanded sheet, the time for attaching work can be shortened. Also, since the expanded sheet protects the wiring harness, the exterior members can be omitted, which enables the vehicle door to be thinned. Further, since the wiring harness is the flat cable or the electric wire formed in a flat shape, further thinning can be achieved.

According to the aspect of the invention described herein, the structure body containing gas phase includes the expanded sheet configured to include an expanded body and the non-woven cloth. The expanded sheet can contribute to improvement in followability to the door trim and improvement in workability of attachment to the door trim, and the non-woven cloth can heighten rigidity of the structure body containing gas phase and exert an effect as an exterior material. Accordingly, the wiring harness can reliably be protected from an edge of the door panel on the side of the vehicle interior outer surface of the door trim, and fixing strength to the door trim can be improved.

According to the aspect of the invention described herein, the structure body containing gas phase includes the non-woven cloth. The non-woven cloth can heighten the rigidity of the structure body containing gas phase and exert the effect as the exterior material. Accordingly, the wiring harness can reliably be protected from the edge of the door panel on the side of the vehicle interior outer surface of the door trim, and the fixing strength to the door trim can be improved.

According to the aspect of the invention described herein, the structure body containing gas phase includes the expanded sheet configured to include an expanded body and the solid sheet material. The expanded sheet can contribute to improvement in followability to the door trim and improvement in workability of attachment to the door trim, and use of the solid sheet material can heighten the rigidity of the structure body containing gas phase. Thus, the fixing strength to the door trim can be improved.

According to the aspect of the invention described herein, the structure body containing gas phase includes the non-woven cloth and the solid sheet material. The non-woven cloth can heighten the rigidity of the structure body containing gas phase and exert the effect as the exterior material. Accordingly, the wiring harness can reliably be protected from the edge of the door panel on the side of the vehicle interior outer surface of the door trim, and the fixing strength to the door trim can be improved. Also, use of the solid sheet material can heighten the rigidity of the structure body containing gas phase. Thus, the fixing strength to the door trim can further be improved.

According to the aspect of the invention described herein, the expanded sheet is fixed to the door trim by causing the fixing portion formed on the vehicle interior outer surface of the door trim and the fixed portion formed in the expanded sheet to engage with each other, and the expanded sheet comes in close contact with the vehicle interior outer surface of the door trim at least around the fixing portion and the fixed portion. Accordingly, the expanded sheet can easily be fixed to the vehicle interior outer surface of the door trim only by causing the fixed portion to engage with the fixing portion.

According to the aspect of the invention described herein, the expanded sheet is configured to include at least the two layers of the low expansion layer made of the low expansion expanded material having the relatively low expansion ratio, or the solid sheet material, and the high expansion layer made of the high expansion expanded material having the higher expansion ratio than that of the low expansion layer. Accordingly, the low expansion layer or the solid sheet material and the high expansion layer can respectively insulate sounds in different frequency bands, and sounds in a wider frequency band can be insulated. Also, use of the low expansion layer or the solid sheet material can heighten the rigidity of the expanded sheet. Thus, the fixing strength to the door trim can be improved. Further, since the high expansion layer has flexibility, the followability to the door trim can be improved, and weight reduction can be achieved.

According to the aspect of the invention described herein, the high expansion layer is provided along the vehicle interior outer surface of the door trim, and the low expansion layer or the sheet material is provided on the opposite side of the vehicle interior outer surface of the door trim with the high expansion layer interposed therebetween. Since the high expansion layer has the flexibility, the followability to the door trim can be improved, and the workability of attachment to the door trim can be improved. Also, the low expansion layer or the sheet material can heighten the rigidity of the expanded sheet and exert the effect as the exterior material. Accordingly, the wiring harness can reliably be protected from the edge of the door panel on the side of the vehicle interior outer surface of the door trim, and the fixing strength to the door trim can be improved.

According to the aspect of the invention described herein, since the expanded sheet is molded by filling and then curing the uncured expanded material into the mold in which the wiring harness is routed, integrity with the wiring harness can be improved. Also, since the expanded sheet is molded by bonding the two sheet-like expanded materials interposing the wiring harness therebetween, the wiring harness can be positioned easily.

DESCRIPTION OF EMBODIMENTS

First Embodiment

Figure 1:
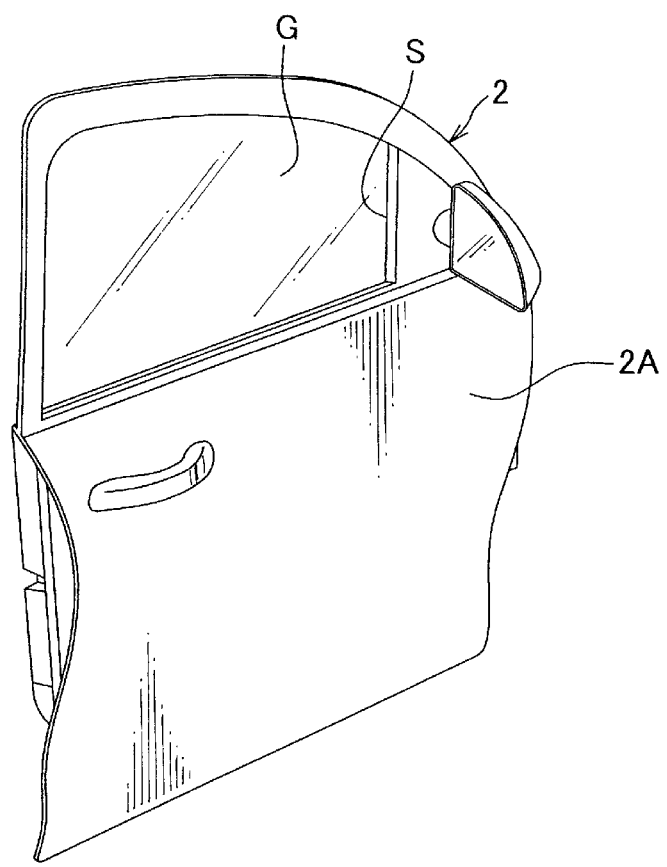
FIG. 1 is a perspective view illustrating a vehicle door having a wiring harness attaching structure according to a first embodiment of the present invention.
Figure 2:
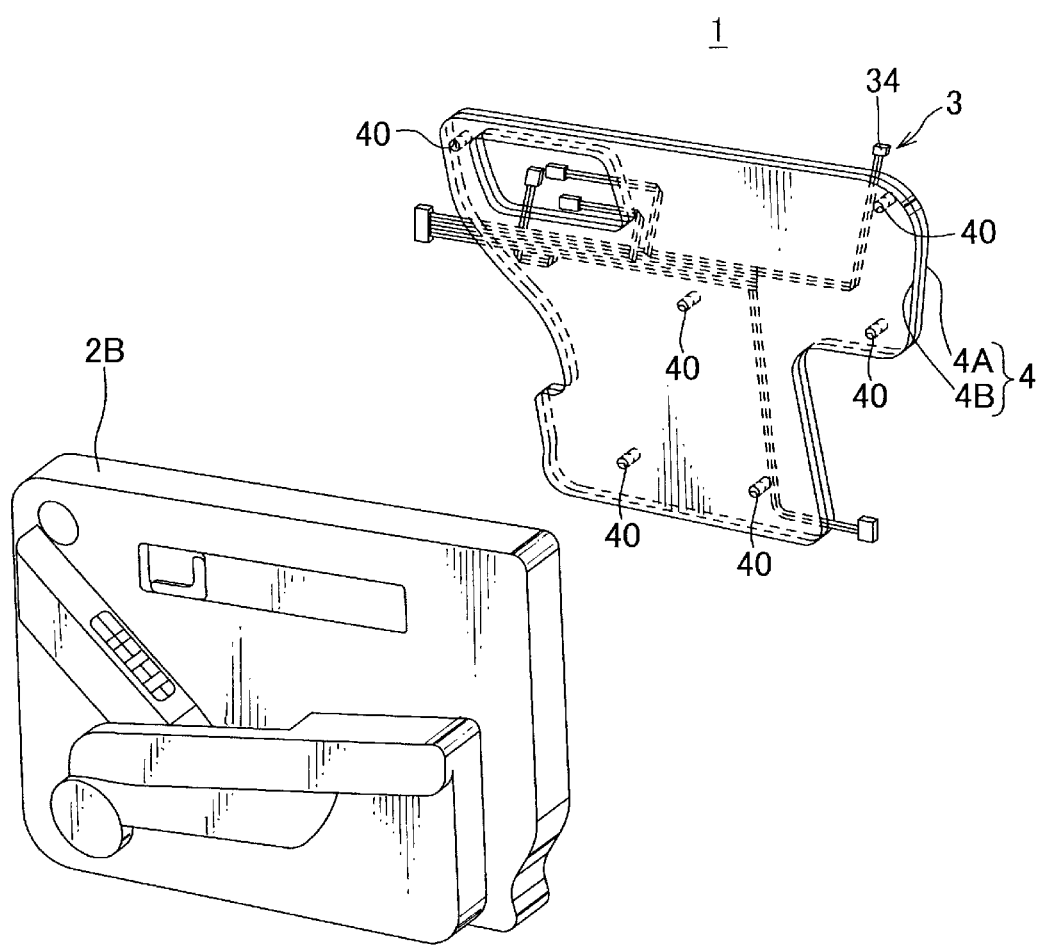
FIG. 2 is a perspective view illustrating a state in which the wiring harness attaching structure illustrated in FIG. 1 is being assembled.

A wiring harness attaching structure according to a first embodiment of the present invention will be described with reference to FIGS. 1 to 6B. A wiring harness attaching structure 1 is for attaching a flat cable 3 (wiring harness) between a door panel 2A and a door trim 2B (illustrated in FIG. 2) constituting a vehicle door 2 as illustrated in FIGS. 1 and 2.

The door panel 2A is made of a steel plate and is provided further on a vehicle interior outer side than the door trim 2B. On an upper side (an upper side in a sheet surface direction in FIG. 1) of the door panel 2A is provided a window frame S inside which window glass G is located.

Figure 3:
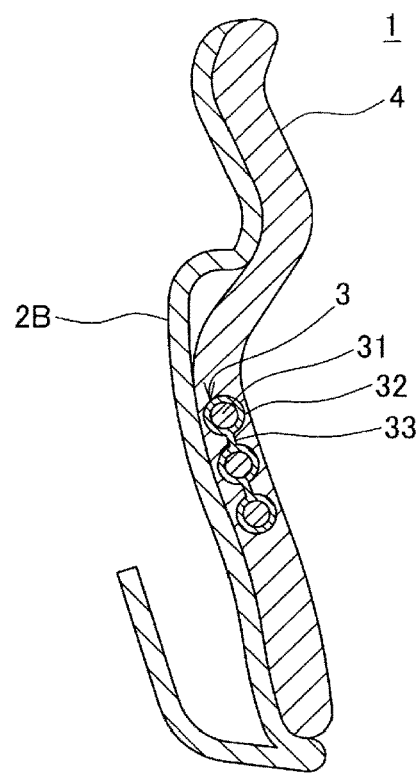
FIG. 3 is a schematic view of the vehicle door having the wiring harness attaching structure illustrated in FIG. 1.

The door trim 2B is made of a synthetic resin. This door trim 2B is provided on an outer surface thereof on a side of the door panel 2A (a vehicle interior outer surface of the door trim) with a plurality of not-illustrated press fit portions (fixing portions) as illustrated in FIGS. 2 and 3. Each of the press fit portions is configured to include a cylindrical shaft portion (not illustrated) erected from the outer surface of the door trim 2B and a large-diameter portion (not illustrated) having a larger diameter than that of the shaft portion. The press fit portion is formed so that a dimension from the outer surface of the door trim 2B to the large-diameter portion may be equal to a thickness of a below-mentioned expanded sheet 4 (a structure body containing gas phase) or make the thickness of the expanded sheet 4 slightly longer.

The flat cable 3 includes a plurality of core wires 31 parallel to one another, insulating covering portions 32 covering the respective core wires 31, and insulating connecting portions 33 connecting the covering portions 32 adjacent to each other as illustrated in FIG. 3. That is, the flat cable 3 is formed in a strip plate shape whose width dimension (a dimension in a direction in which the plurality of core wires 31 is arrayed) is longer than a thickness dimension. The flat cable 3 is arranged to be opposed to the outer surface of the door trim 2B. Each core wire 31 is formed by twisting a plurality of strands. The covering portions 32 and the connecting portions 33 are made of a synthetic resin and are integrally molded to one another. To each end portion of the flat cable 3 is attached a connector 34 (illustrated in FIG. 2). One connector 34 is connected to a circuit on a power supply side while another connector 34 is connected to a circuit on a load side. This flat cable 3 is attached to the door trim 2B in a state in which the flat cable 3 is held inside the expanded sheet 4 (described below), and in which the connectors 34 are exposed outward.

Figure 4:
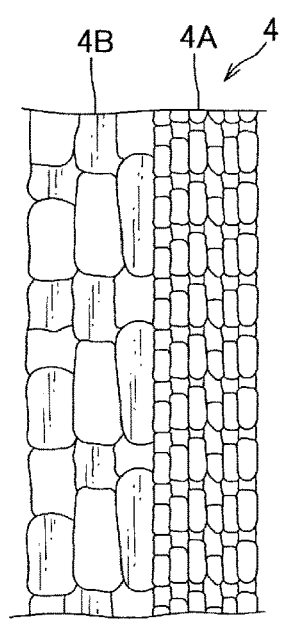
FIG. 4 illustrates a structure of an expanded sheet constituting the wiring harness attaching structure illustrated in FIG. 1.

The expanded sheet 4 as the structure body containing gas phase has sound-proof properties and heat insulating properties, has a plate thickness formed to be longer than the thickness dimension of the flat cable 3, and is formed to correspond to the door trim 2B in size, as illustrated in FIGS. 2 and 3. This expanded sheet 4 includes two layers of a low expansion layer 4A made of an expanded material having a relatively low expansion ratio and a high expansion layer 4B made of a high expansion expanded material having a higher expansion ratio than that of the low expansion layer 4A as illustrated in FIG. 4, and the flat cable 3 is located at a boundary position between the low expansion layer 4A and the high expansion layer 4B and is interposed and held between the low expansion layer 4A and the high expansion layer 4B. The high expansion layer 4B is provided on the vehicle interior outer side (that is, the side of the door panel 2A) of the door trim 2B, and the low expansion layer 4A is provided, with the high expansion layer 4B interposed between the low expansion layer 4A and the door trim 2B. The low expansion layer 4A is made of polyethylene expanded at an expansion ratio of 1 to 10 times. The high expansion layer 4B is made of polyurethane expanded at an expansion ratio of 10 to 50 times. A thickness dimension of the low expansion layer 4A and a thickness dimension of the high expansion layer 4B are formed to be approximately equal. Such an expanded sheet 4 including the two layers of the low expansion layer 4A and the high expansion layer 4B can insulate sounds in the frequency band of 100 to 10000 Hz.

Also, the expanded sheet 4 is provided with press fit receiving portions 40 (fixed portions) in which the press fit portions formed on the door trim 2B are pressed as illustrated in FIG. 3. The plurality of press fit receiving portions 40 is provided to be spaced from one another at locations other than a routing path of the flat cable 3 designed in advance. Each of these press fit receiving portions 40 is a through hole formed in the expanded sheet 4, and an inside diameter thereof is formed to be shorter than an outside diameter of the large-diameter portion of the press fit portion.

Figure 5A:
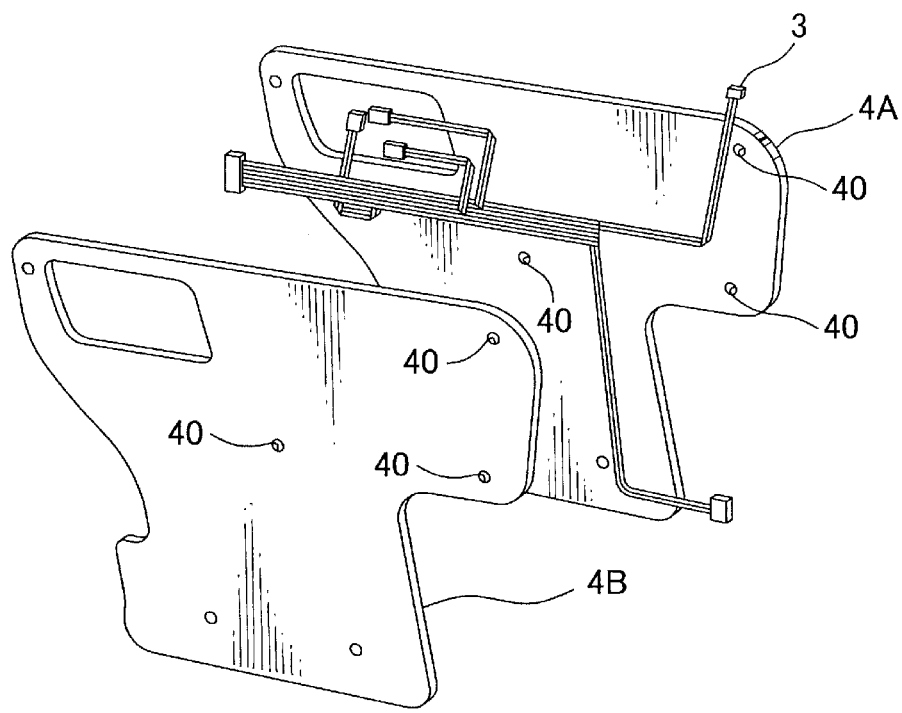
FIGS. 5A and 5B are schematic views illustrating a state of manufacturing the expanded sheet in a state in which a flat cable is held therein illustrated in FIG. 2.
Figure 5B:
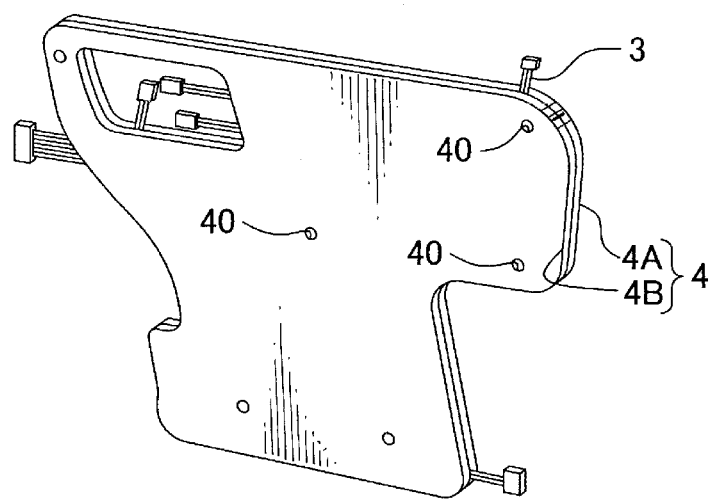

Next, a procedure for attaching the flat cable 3 to the outer surface of the door trim 2B will be described with reference to FIGS. 5A and 5B. First, as illustrated in FIG. 5A, the low expansion layer 4A and the high expansion layer 4B are separately manufactured in advance, the flat cable 3 is arranged on the low expansion layer 4A in a state of being formed in a routing shape, and adhesive is applied entirely on a surface of the high expansion layer 4B. As illustrated in FIG. 5B, the high expansion layer 4B is overlaid on the low expansion layer 4A. The flat cable 3 is interposed and held inside the expanded sheet 4, that is, between the low expansion layer 4A and the high expansion layer 4B, in a state in which the connectors 34 are exposed outward.

The side of the high expansion layer 4B of the expanded sheet 4 holding the flat cable 3 is got close to the door trim 2B to fit the press fit receiving portions 40 of the expanded sheet 4 with the press fit portions of the door trim 2B. The thickness dimension of the expanded sheet 4 is formed to be shorter than the dimension between the outer surface of the door trim 2B and the large-diameter portion of each press fit portion, and thus when the press fit receiving portions 40 of the expanded sheet 4 are fitted with the press fit portions of the door trim 2B, the expanded sheet 4 around the press fit receiving portions 40 located between the outer surface of the door trim 2B and the large-diameter portions is compressed, and the expanded sheet 4 is fixed to the door trim 2B around the press fit receiving portions 40 in a state in which the expanded sheet 4 comes in close contact with the outer surface of the door trim 2B. In this manner, the flat cable 3 held inside the expanded sheet 4 is attached to the door trim 2B.

According to the aforementioned embodiment, since the flat cable 3 is located inside the elastic expanded sheet 4 and is provided integrally with the expanded sheet 4, the vehicle door 2 can be thinned, and time for attaching work can be shortened.

The vehicle interior outer surface of the door trim 2B is provided with the press fit portions each including the shaft portion and the large-diameter portion having a larger diameter than that of the shaft portion, the expanded sheet 4 is provided with the press fit receiving portions 40 pressed by the press fit portions, and the dimension between the vehicle interior outer surface of the door trim 2B and the large-diameter portion is formed to be shorter than the thickness dimension of the expanded sheet 4. Accordingly, the expanded sheet 4 comes in close contact with the vehicle interior outer surface of the door trim 2B around the press fit portions and the press fit receiving portions 40, and buffering between the expanded sheet 4 and the door trim 2B does not cause abnormal sounds to be generated by vibration of the automobile during traveling, which can prevent the soundproof properties from being impaired. Also, to detach the expanded sheet 4 from the door trim 2B, the expanded sheet 4 can be detached easily by pulling the expanded sheet 4 in a direction away from the door trim 2B.

Meanwhile, although the expanded sheet 4 includes the two layers of the low expansion layer 4A and the high expansion layer 4B made of the expanded materials having different expansion ratios from each other in the aforementioned embodiment, the expanded sheet 4 may include three or more layers made of expanded materials having different expansion ratios from one another or may include an expanded material having an equal expansion ratio, that is, a single layer. Alternatively, a non-woven cloth may be applied as the expanded sheet 4. Also, although the low expansion layer 4A and the high expansion layer 4B are attached through adhesion, they may be attached through welding or with use of an adhesive material (a double-sided tape). Also, although the expanded sheet 4 is formed so that the thickness dimensions of the low expansion layer 4A and the high expansion layer 4B may be equal, the present invention is not limited to this, and the thickness dimensions of the layers 4A and 4B may arbitrarily be changed in accordance with various required design conditions such as heat insulating properties and sound insulating properties.

Figure 6A:
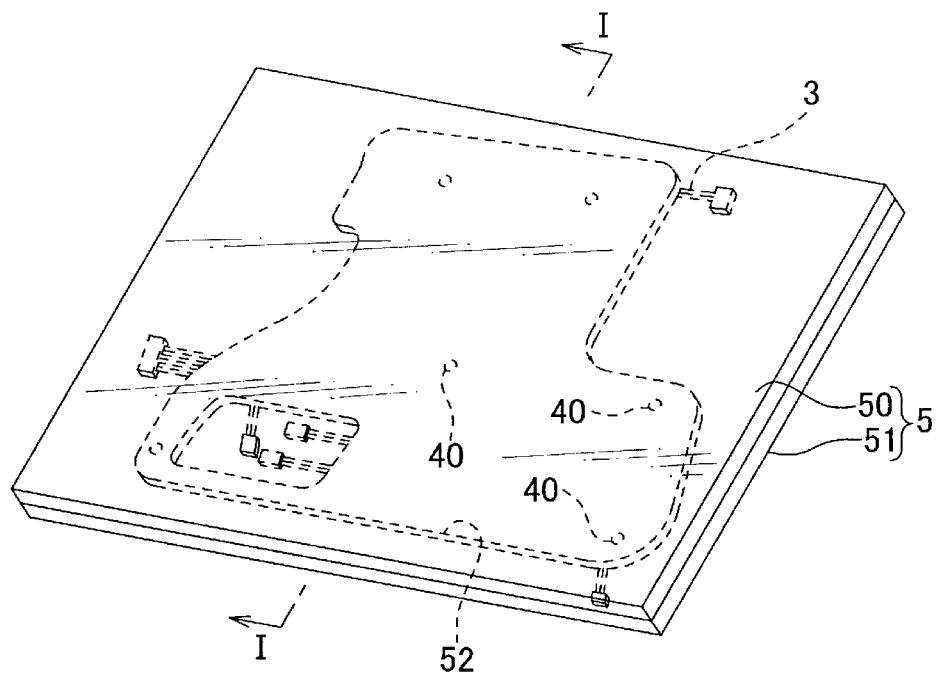
FIGS. 6A and 6B are schematic views illustrating a state of manufacturing the expanded sheet in the state in which the flat cable is held therein illustrated in FIG. 2.
Figure 6B:
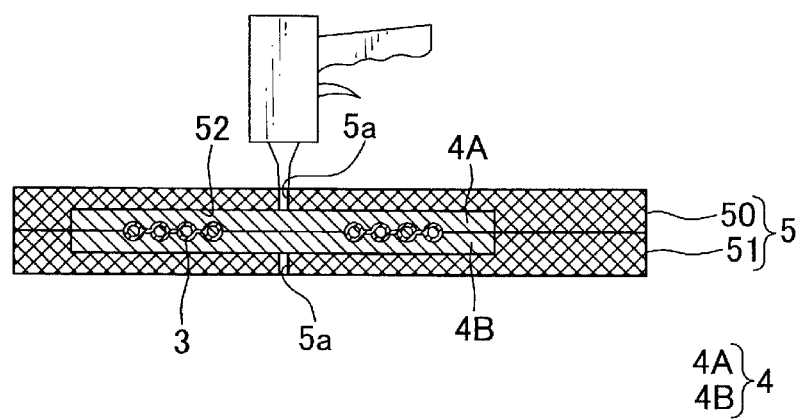

Also, although the expanded sheet 4 is formed by bonding the low expansion layer 4A and the high expansion layer 4B together in the aforementioned embodiment, the present invention is not limited to this. As illustrated in FIGS. 6A and 6B, a metal mold 5 in which a cavity 52 is formed may be provided, this metal mold 5 may include upper and lower molds 50 and 51 overlapping each other, and the expanded sheet 4 in which the flat cable 3 is buried may be molded by forming and arranging the flat cable 3 in the routing shape and filling and curing uncured expanded materials having different expansion ratios through respective inlets 5a of the upper and lower molds 50 and 51 in this state.

Also, although the low expansion layer 4A is made of polyethylene while the high expansion layer 4B is made of polyurethane in the aforementioned embodiment, the present invention is not limited to this. The low expansion layer 4A and the high expansion layer 4B may be made of expanded materials such as urethane, polyethylene, polypropylene, polystyrene, melamine, and an elastomer, and the expanded materials and the expansion ratios used may arbitrarily be changed in accordance with various required design conditions such as heat insulating properties and sound insulating properties.

Also, although the expanded sheet 4 includes the two layers of the low expansion layer 4A and the high expansion layer 4B in the aforementioned embodiment, the present invention is not limited to this. The expanded sheet 4 may include a solid sheet material made of a synthetic resin and not containing air bubble, instead of the low expansion layer 4A, and the high expansion layer 4B. The sheet material may be highly abrasion-resistant, have a function as an exterior for the flat cable 3, and be made of a synthetic resin such as polypropylene, polyethylene, and polyvinyl chloride. Alternatively, the expanded sheet 4 may include three layers of the aforementioned sheet material, the low expansion layer 4A, and the high expansion layer 4B. That is, the expanded sheet 4 has only to be configured to include at least an expanded body.

Also, although the press fit portions provided on the door trim 2B are pressed into the press fit receiving portions 40 provided in the expanded sheet 4 to fix the expanded sheet 4 to the door trim 2B in the aforementioned embodiment, the present invention is not limited to this. The expanded sheet 4 holding the flat cable 3 may be attached to the door trim 2B through adhesion or welding or may be fixed to the door trim 2B with use of screws.

Second Embodiment

Next, the wiring harness attaching structure according to a second embodiment of the present invention will be described. The aforementioned first embodiment has been described by illustrating an example in which the structure body containing gas phase includes the expanded sheet or includes at least the expanded sheet. However, in the wiring harness attaching structure according to the second embodiment, an example in which "the structure body containing gas phase" includes an expanded sheet and a non-woven cloth (not illustrated) will be described. The wiring harness attaching structure according to the present embodiment has an equal configuration to that of the wiring harness attaching structure according to the first embodiment except "the structure body containing gas phase."

In the present embodiment, the structure body containing gas phase includes an expanded sheet made of an expanded body and a non-woven cloth and is attached along a vehicle interior outer surface of a door trim in a state of interposing and holding the flat cable 3 between the expanded sheet and the non-woven cloth, and the flat cable 3 is attached to the door trim together with the expanded sheet and the non-woven cloth.

The expanded sheet has only to be made of an expanded material such as urethane, polyethylene, polypropylene, polystyrene, melamine, and an elastomer, and the expanded material and the expansion ratio used may arbitrarily be changed in accordance with various required design conditions such as heat insulating properties and sound insulating properties. The non-woven cloth is made of polypropylene, polyester, or a polyester resin. The material and the configuration used for the non-woven cloth may arbitrarily be changed in accordance with various required design conditions such as heat insulating properties and sound insulating properties.

Meanwhile, although the aforementioned second embodiment has been described by illustrating the example in which the structure body containing gas phase includes the expanded sheet and the non-woven cloth, the present invention is not limited to this. The structure body containing gas phase may include only the non-woven cloth. Two or more non-woven clothes having different materials and configurations used may be used. Also, the structure body containing gas phase may be configured to include the expanded sheet made of the expanded body and a film (a solid sheet material), or the structure body containing gas phase may be configured to include the non-woven cloth and the film.

The film may be highly abrasion-resistant, have a function as an exterior for the flat cable 3, and be made of a synthetic resin such as polypropylene, polyethylene, and polyvinyl chloride. The material and the configuration used for the film may arbitrarily be changed in accordance with various required design conditions such as heat insulating properties and sound insulating properties. Also, two or more films having different materials and configurations used may be used.

Also, although the core wire 31 used is formed by twisting the plurality of strands in the aforementioned embodiments, the present invention is not limited to this, and the core wire 31 may be a single core wire consisting of a single strand.

Figure 7:
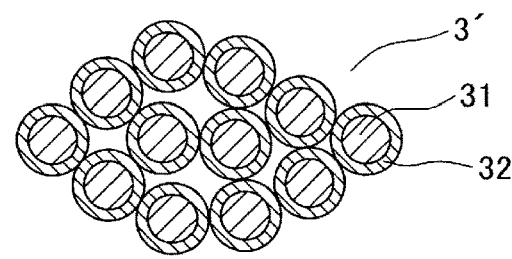
FIG. 7 is a plan view illustrating a modification example of the wiring harness attaching structure illustrated in FIG. 1.
Figure 8:
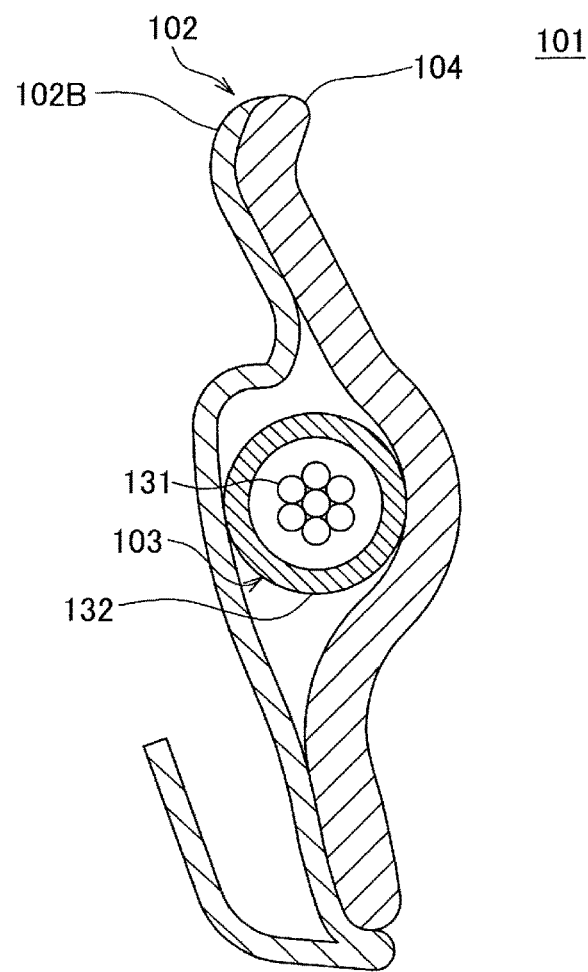
FIG. 8 is a schematic view illustrating a conventional wiring harness attaching structure.
Figure 9:
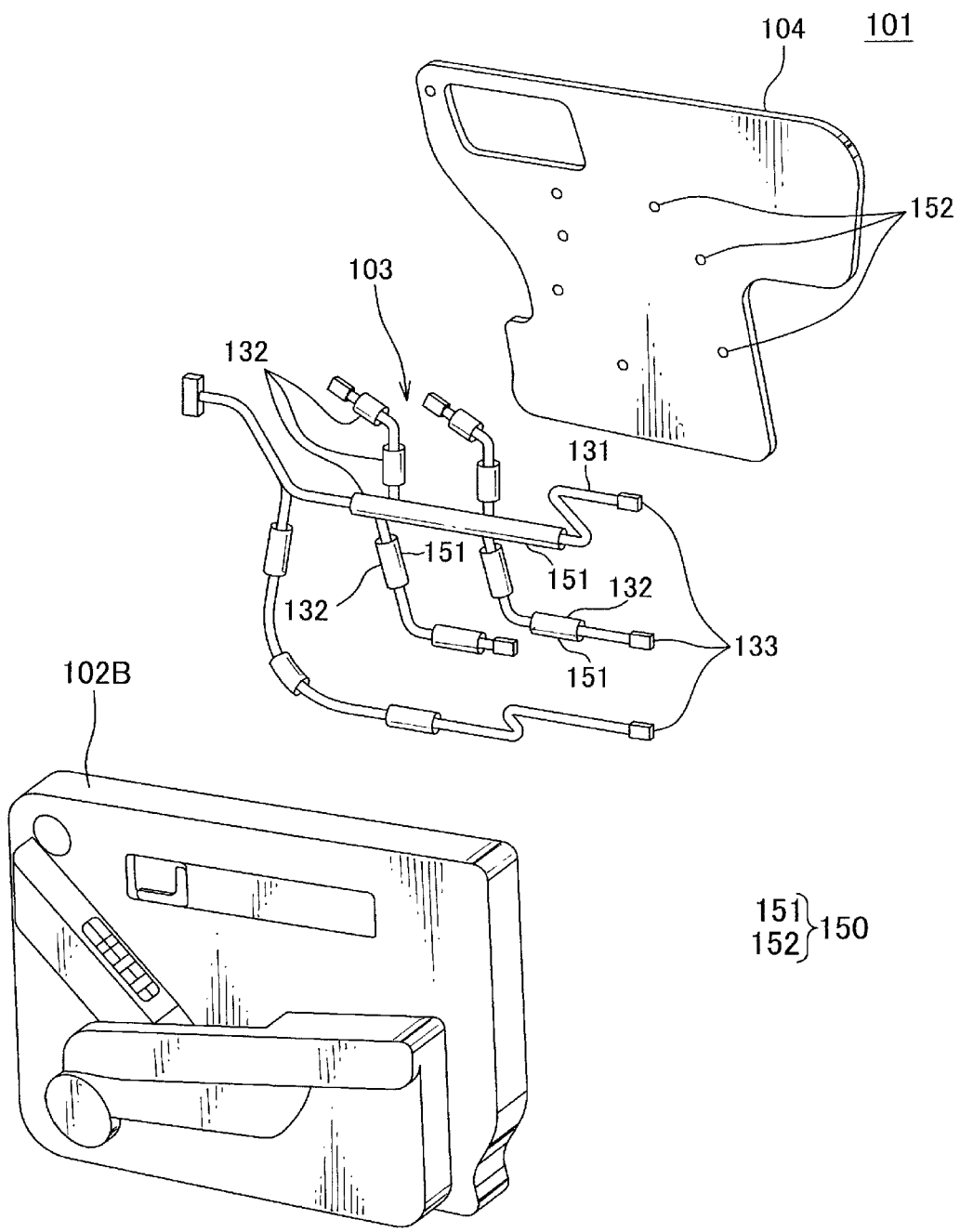
FIG. 9 is an exploded perspective view illustrating the conventional wiring harness attaching structure illustrated in FIG. 8.
Figure 10:
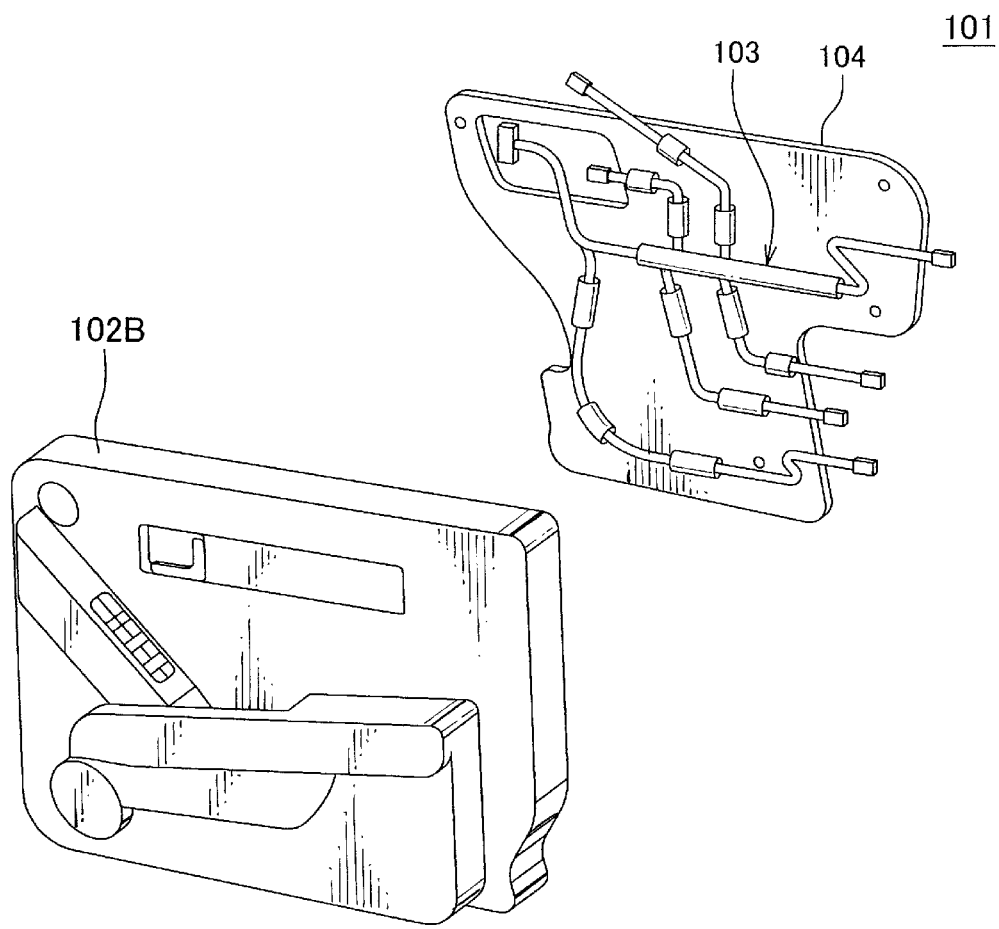
FIG. 10 illustrates a state in which the conventional wiring harness attaching structure illustrated in FIG. 9 is being assembled.

Also, although in the aforementioned embodiments is used the flat cable 3 including the plurality of core wires 31 parallel to one another, the insulating covering portions 32 covering the respective core wires 31, and the insulating connecting portions 33 connecting the covering portions 32 adjacent to each other, a ribbon wire which has no connecting portions 33 and in which the covering portions 32 adjacent to each other are connected may be used. Also, as "an electric wire formed in a flat shape" in the claims, a flat electric wire in which a conductor having a flattened cross-section is covered with a synthetic resin may be used, a flexible printed circuit (FPC) may be used, or assembled wires each having a circular cross-section may be arranged in a flat shape and used. Also, as the wiring harness, an electric wire 3' in which electric wires are arranged so that a width dimension (a dimension in a right-left direction in FIG. 7) may be longer than a thickness dimension (a dimension in an up-down direction in FIG. 7) may be used as illustrated in FIG. 7.

Also, the aforementioned embodiments are illustrative only, and the present invention is not limited to the embodiments. That is, the present invention can be carried out in various forms without departing from the scope of the present invention.

REFERENCE SIGNS LIST

1 Wiring harness attaching structure
2 Vehicle door
2B Door trim
3 Flat cable (Wiring harness)
4 Expanded sheet (Structure body containing gas phase)
4A Low expansion layer
4B High expansion layer

The invention claimed is:

1. A wiring harness attaching structure for attaching a wiring harness to a vehicle interior outer surface of a door trim constituting a vehicle door, wherein
　the wiring harness is a flat cable whose width dimension is longer than a thickness dimension or an electric wire formed in a flat shape,
　　is located inside a structure body containing gas phase, and
　　is provided integrally with the structure body containing gas phase,
　the structure body containing gas phase is attached along the vehicle interior outer surface of the door trim, and
　the wiring harness is attached to the door trim together with the structure body containing gas phase, wherein
　the structure body containing gas phase includes an expanded sheet configured to include an expanded body, wherein
　the expanded sheet is configured to include one or more layers having at least one of
　　a low expansion layer made of a low expansion expanded material having a relatively low expansion ratio and
　　a high expansion layer made of a high expansion expanded material having a higher expansion ratio than that of the low expansion layer, and
　wherein the wiring harness is buried between the low expansion layer and the high expansion layer.

2. The wiring harness attaching structure according to claim 1, wherein
　the expanded sheet is fixed to the door trim by causing a fixing portion formed on the vehicle interior outer surface of the door trim and a fixed portion formed in the expanded sheet to engage with each other, and
　the expanded sheet comes in close contact with the vehicle interior outer surface of the door trim at least around the fixing portion and the fixed portion.

3. The wiring harness attaching structure according to claim 1, wherein
　the expanded sheet in a state in which the wiring harness is located therein
　　is molded by filling and then curing an uncured expanded material into a mold housing the wiring harness.

* * * * *